US008547575B2

(12) United States Patent
Mohammad et al.

(10) Patent No.: US 8,547,575 B2
(45) Date of Patent: Oct. 1, 2013

(54) PRINTER DISCOVERY WITHIN A WEB PAGE

(75) Inventors: Soiba Mohammad, Winnetka, CA (US);
Hitoshi Sekine, Los Altos, CA (US);
Yao-Tian Wang, East Palo Alto, CA (US)

(73) Assignee: Ricoh Company, Ltd, Tokyo (JP)

( * ) Notice: Subject to any disclaimer, the term of this patent is extended or adjusted under 35 U.S.C. 154(b) by 644 days.

(21) Appl. No.: 12/720,492

(22) Filed: Mar. 9, 2010

(65) Prior Publication Data
US 2011/0222104 A1 Sep. 15, 2011

(51) Int. Cl.
*G06F 3/12* (2006.01)
*G06F 15/16* (2006.01)
*G06F 15/173* (2006.01)

(52) U.S. Cl.
USPC ......... 358/1.15; 358/1.13; 709/219; 709/224; 709/226

(58) Field of Classification Search
None
See application file for complete search history.

(56) References Cited

U.S. PATENT DOCUMENTS

| 7,277,929 | B2 * | 10/2007 | Ohara ........................... 709/219 |
| 2003/0005100 | A1 * | 1/2003 | Barnard et al. ............... 709/223 |
| 2004/0130744 | A1 * | 7/2004 | Wu et al. ...................... 358/1.15 |

FOREIGN PATENT DOCUMENTS

| EP | 1248185 A2 | 10/2002 |
| EP | 1422609 A2 | 5/2004 |

* cited by examiner

*Primary Examiner* — Thomas Lett
(74) *Attorney, Agent, or Firm* — Duft Bornsen & Fettig, LLP

(57) ABSTRACT

Systems and methods presented herein provide for printer discovery with a webpage such that a client device may print the webpage via a remote printing service. The client device retrieves a webpage with an internet browser. The webpage includes a printer detection module that detects printing devices of one data network and transfers their printing characteristics to a print server in another data network. The printer detection module is accessible through the webpage. The printer detection module allows for the selection of one or more of the printing devices. The client device transfers the webpage (or the URL of the webpage) to the print server to render the webpage for printing on the selected printing device. The print server renders the webpage according to the printing characteristics of the selected printing device and then transfers the rendered webpage to the selected printing device via the client device for printing.

23 Claims, 6 Drawing Sheets

PRINTER DISCOVERY WITHIN A WEB PAGE

BACKGROUND

1. Field of the Invention

The invention relates generally to providing remote printing services to a client device.

2. Discussion of Related Art

In a printing environment, various print options exist when printing a document on a printing device. For example, a user may desire to print a document with duplex printing, stapling, sorting, etc., for a document to be printed. After the user selects the various print job options, a print job is generated for the document to be printed. The generated print job is subsequently submitted to a printing device for printing on some form of printable media.

Typically, the available print options for a specific printing device are established when a printing device is installed on a client device (i.e., a print driver of the printing device is installed with a print capabilities file on the client device). For example, when a print driver is installed on a computer, various print options for the printing device may be specified by a user, such as what paper trays are available, the size of the paper in each tray, the amount of memory within the printing device, etc. The print capabilities file allows the client device to consistently identify the print capabilities of a specific printing device. When a print job for the printing device is generated using the print driver and the print capabilities file, the various print options for the print job are converted into device specific commands for the printing device. The device specific commands are generally unique to a particular vender or model of the printing device. Various web print services, however, exist which allow client devices to transfer the process of print job generation to a server operating the web print services. Such services may be utilized, for example, when the client device either lacks the rendering capability for the print job or is simply too limited in performance for rendering the print job on the client device in a reasonable amount of time. In such cases, the server executing a web print service renders the print job for the client. In doing so, the client device connects to the server on one data network (often referred to as a "cloud") and sends a document to the server, specifying the printer model to be used. The server may then generate a Page Descriptor Language PDL rendition of the document and send to the rendered document to a printer in another data network for printing. However, such printing services are generally not available to the printing of webpages being viewed on certain client devices. For example, a mobile client device may view a webpage within a certain data network configured with a variety of printers. Since that mobile client device is not likely to be configured with print drivers for the printers in that data network, the mobile client device is not able to print to any of those local printers.

SUMMARY

The systems and methods presented herein provide remote print services to client devices via web-based printer detection. For example, a printer detection module is embedded within a client device that enables the client device to, without knowledge of printing devices within a data network, detect the printing devices. Since security restrictions within an Internet browser generally do not allow scripts to execute within web content and make network connections to devices other than the server from which the web content came, the printer detection module may be configured as an applet or a similar software module to query the data network of the printing devices. The printer detection module then provides the client device with printing device choices. Once a printing device is selected, the webpage is rendered with a remote rendering service (e.g., an internet print server) and transferred to the printing device for printing via the client device.

In one embodiment, a method of printing includes retrieving a webpage with an internet browser that is operable within a computing device. The webpage includes a printer detection module (e.g., an applet) that is operable to detect printing devices in a first data network and transfer printing characteristics of those printing devices to a print server in a second data network. For example, the printer detection module may transfer a set of print capabilities of a printer to the print server in the form of a job ticket. Generally, the print capabilities are a set of hardware and software options that are configured for a specific printing device. Whereas the job ticket defines the subset of printer capabilities that are to be used for a particular print job, not all of the print capabilities for a particular printer may be used in the print job (e.g., duplex printing may be an available option for a particular printer but not desired during printing of the print job).

The method also includes accessing the printer detection module with the computing device through the webpage, selecting one of the printing devices via the printer detection module, and transferring the webpage from the computing device to the print server to render the webpage for printing on the selected printing device. The method also includes rendering the webpage according to the printing characteristics of the selected printing device. For example, the method may also include determining a print driver of the printing device at the print server based on the printing characteristics and rendering the webpage via the print driver. The method also includes transferring the rendered webpage from the print server to the selected printing device via the computing device, and printing the rendered webpage on the selected printing device.

The method may also include establishing an SNMP connection between the selected printing device and the printer detection module to determine an IP address of the selected printing device. For example, printer detection module may detect the first data network via through an SNMP connection between the printing device in the per detection module. From there, the printer detection module may determine IP addresses of the printing device as well as other characteristics of the printing device. The method may also include generating a print job that includes the rendered webpage. In this regard, the method includes transferring the print job to the printing device via the computing device. The method may also include retrieving the print driver from an external source when the print driver is not located within the print server. For example, if the print server receives printing characteristics and is unable to identify the appropriate print driver, a print server may access the Internet through a web server to locate and retrieve the appropriate print driver.

In another embodiment, a remote printing system includes a plurality of printing devices operable within a first data network and a print server operable within a second data network to render print jobs for the printing devices. The remote printing system also includes a printer detection module operable within a webpage to detect the printing devices in the first data network and present the printing devices to a client device for selection. The printer detection module is further operable to receive a printing device selection, transfer the webpage and the printing characteristics of the printing device to the print server. The print server is further operable to determine a driver for the selected printing device based on the printing characteristics and render the webpage according to the determined driver.

In another embodiment, a printer detection module is operable within a webpage that is executable on a client device. The printer detection module includes software instructions that, when executed by a processor of the client device, direct the processor to detect printing devices in a first data network, receive a selection for one or more of the printing devices, and transfer printing characteristics of the selected one or more printing devices to a print server in a second data network. The printer detection module also includes software instructions that direct the processor to transfer the webpage from the client device to the print server to render the webpage for printing on the selected printing device, receive the rendered webpage from the print server, and transfer the rendered webpage to the selected one or more printing devices for printing therewith.

BRIEF DESCRIPTION OF THE DRAWINGS

The same reference number represents the same element or same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
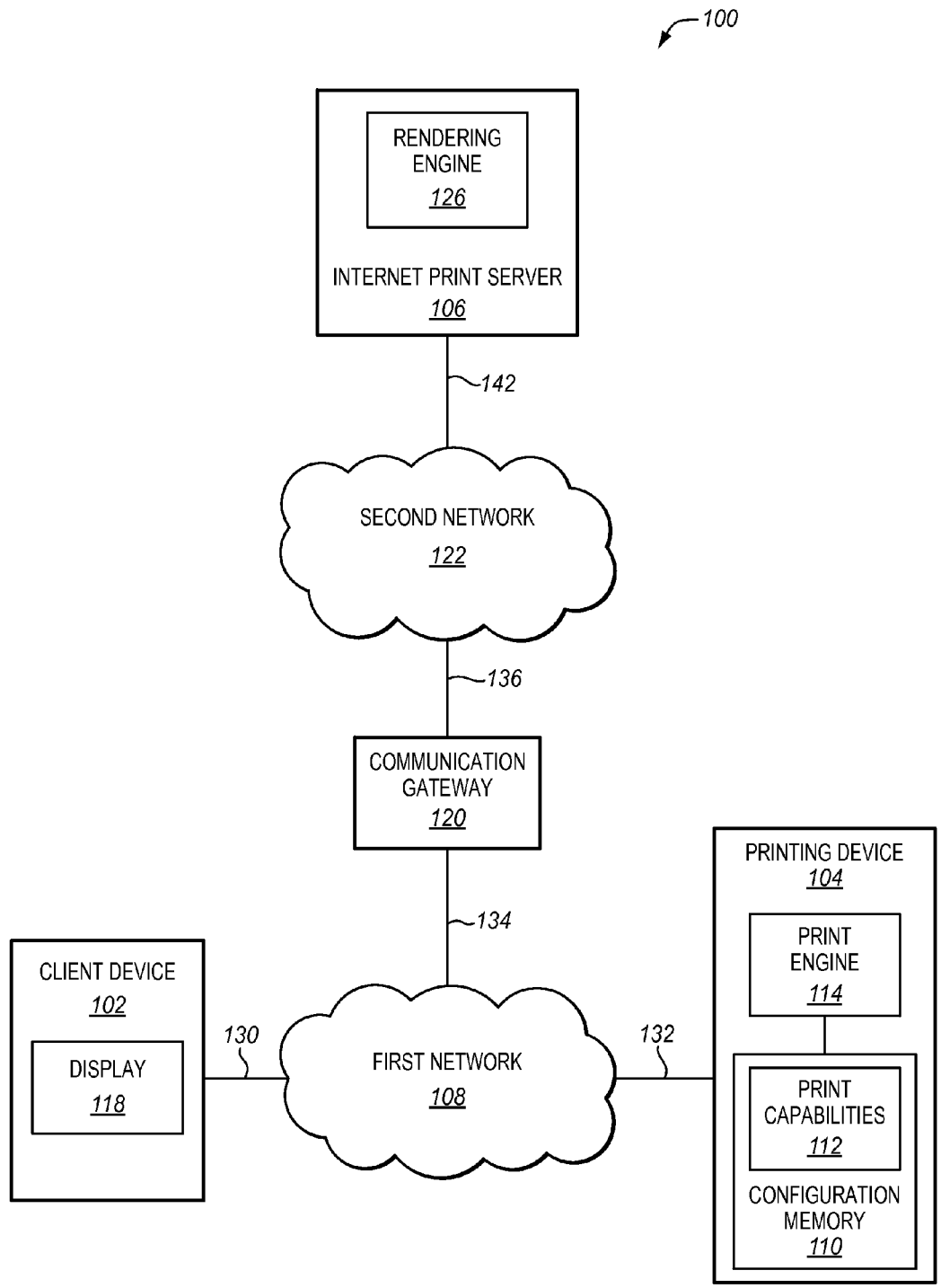
FIG. 1 is a block diagram of an exemplary printing system with remote rendering capabilities.

FIG. 1 is a block diagram of an exemplary the printing system 100 for remotely rendering print jobs via an internet print server 106. The printing system 100 includes a client device 102 and a printing device 104. The printing system 100 may additionally include in some embodiments a communication gateway 120. Although the printing system 100 has been illustrated using specific elements, one skilled in the art will recognize that the printing system 100 may include more or fewer elements as a matter of design choice. Additionally, one skilled in the art will recognize that the printing system 100 may include any number of circuits, programmable logic devices, processors, memory devices, printing devices, client devices, and internet print servers operable to perform the functionality disclosed herein.

In the printing system 100, the client device 102 is operable to obtain the print capabilities 112 from the printing device 104 and to provide the print capabilities 112 to the internet print server 106. For example, the client device 102 generates a job ticket that includes certain characteristics and printing capabilities of the printing device 104. After obtaining the print capabilities 112, the internet print server 106 may utilize the print capabilities 112 when rendering a print job for the printing device 104. For example, the Internet print server 106 may determine the appropriate print driver for the printing device 104 based on the print capabilities 112 and render the print job using the determined print driver. If the print driver cannot be located within the Internet print server 106, the Internet print server 106 may access the Internet (e.g., via a Web server) to locate and retrieve the appropriate print driver to render the print job.

The client device 102 of the printing system 100 includes any device operable to communicate with the printing device 104 and the internet print server 106. The client device 102 may include any number of devices, such as personal digital assistants (PDAs), mobile and/or network enabled telephones (e.g., "smart phones"), portable computers, desktop computers, and the like. The client device 102 also includes a display 118 to provide a user an interface for, among other things, displaying various print options of the printing device 104 prior to printing. The client device 102 is coupled with the printing device 104 through a first network 108 and the network connections 130 and 132.

The printing device 104 of the printing system 100 includes any device operable to print a print job (e.g., a printer, a network enabled copier, a multifunction device, etc.). The print capabilities 112 may be configured within a memory 110 of the printing device 104. The print capabilities 112 are a set of hardware and software options that are configured for a specific printing device. For example, the print capabilities 112 may include a variety of print configuration parameters for the printing device 104, such as the printer type, number of sheets of paper available for printing, paper trays of the printing device 104, and various finishing options for a print job (e.g., duplex printing, stapling, sorting, etc.). The print capabilities 112 may also include information about the printing device 104, such as an amount of memory available for processing a print job within the printing device 104, an amount and type of toner or color cartridges available for printing the print job, resolutions available for printing the print job, a model name, an Institute of Electrical and Electronic Engineer ID (IEEE-ID), and the types of page description languages (PDLs) supported by the printing device 104. The printing device 104 also includes a print engine 114. The print engine 114 comprises any device operable to transfer print data to a printable medium, such as a thermal printing head, a laser print engine, and an ink ejection droplet system.

The internet print server 106 of the printing system 100 includes any device operable to receive document data from the client device 102 and render the document data into a print job for printing on the printing device 104. The internet print server 106 is communicatively coupled to the second network 122 through a network connection 142. The internet print server 106 may include a computer operating a web application service (WAS) for web based printing. The internet print server 106 may reside within the internet, accessible using a public Internet Protocol (IP) address. The internet print server 106 additionally includes a rendering engine 126. The rendering engine 126 processes document data and print options to generate a print job for the printing device 104.

The client device 102 may operate as an intermediary print job handler for the internet print server 106. For example, the internet print server 106 may transmit rendered print jobs to the client device 102. The client device 102 may then forward the print job to the printing device 104 for printing. As discussed above, a user of the client device 102 may wish to print document data on the printing device 104 using the internet print server 106 due to the lack of rendering capabilities within the client device 102. The client device 102 may also wish to preview print data for the document data on the display 118 of the client device 102. In either case, the client device 102 may utilize the internet print server 106 for this functionality.

When the internet print server 106 renders the document data for the client device 102 into a print job, the print capabilities 112 are also utilized. For example, a user of the client device 102 may wish to include various print job options (e.g., a selected set of the print capabilities 112) for the print job, such as stapling, duplexing, sorting, the type of paper used, or other options based on specific the print capabilities 112 of the printing device 104. Such may be provided by the print capabilities 112.

Figure 2:
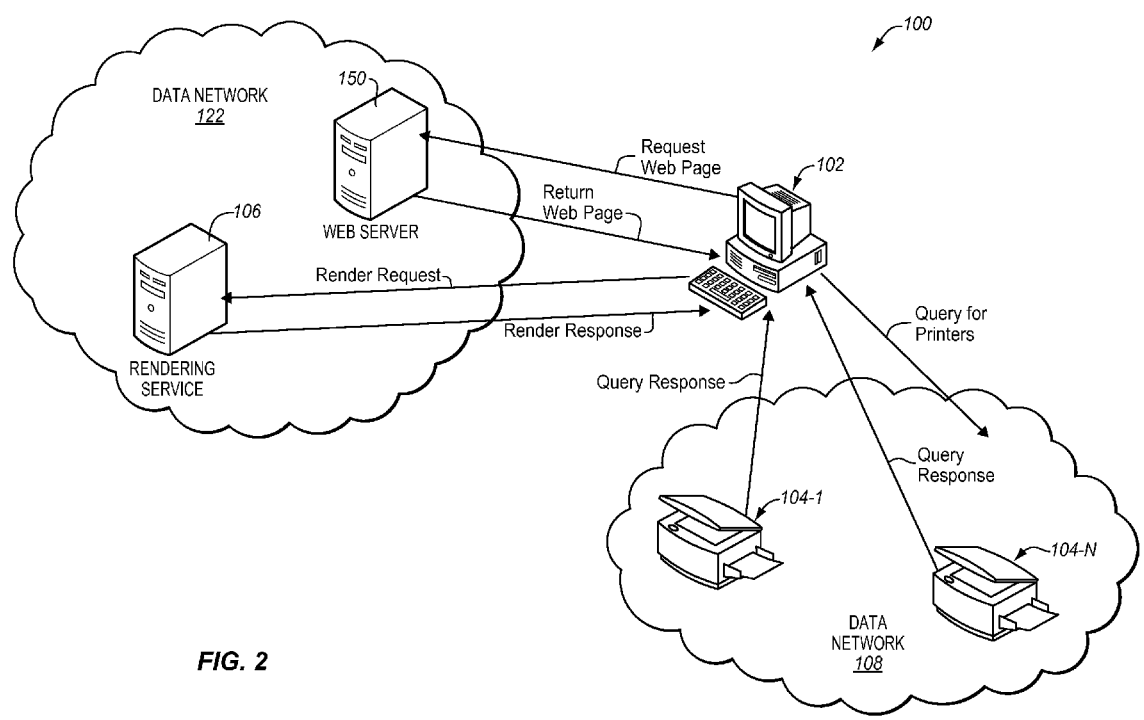
FIG. 2 is a block diagram of the exemplary printing system configured for providing printer detection and selection capabilities to a client device.

FIG. 2 is a block diagram of the exemplary printing system 100 configured for providing printer detection and selection capabilities to the client device 102. In this embodiment, the printing system 100 is configured with a plurality of printing devices 104-1 . . . N within a data network 108, where N is an integer greater than 1. Also shown in this embodiment is a web server 150 configured within the data network 122. The web server 150 is operable to provide Internet data (e.g., websites) to the client device 102. In this regard, the client device 102 may issue a request for a webpage from the web server 150 through, for example, an Internet browser. Since the client device 102 may be a mobile device configured with limited capabilities (e.g., limited or nonexistent print capabilities), the Internet browser may be configured to operate within those capabilities. Examples of such Internet browsers include mobile versions of Safari, Firefox, Internet Explorer, Chrome, and the like. The operational details of providing the printer detection and selection capabilities to the client device 102 within the printing system 100 are now shown and described with respect to FIG. 3.

Figure 3:
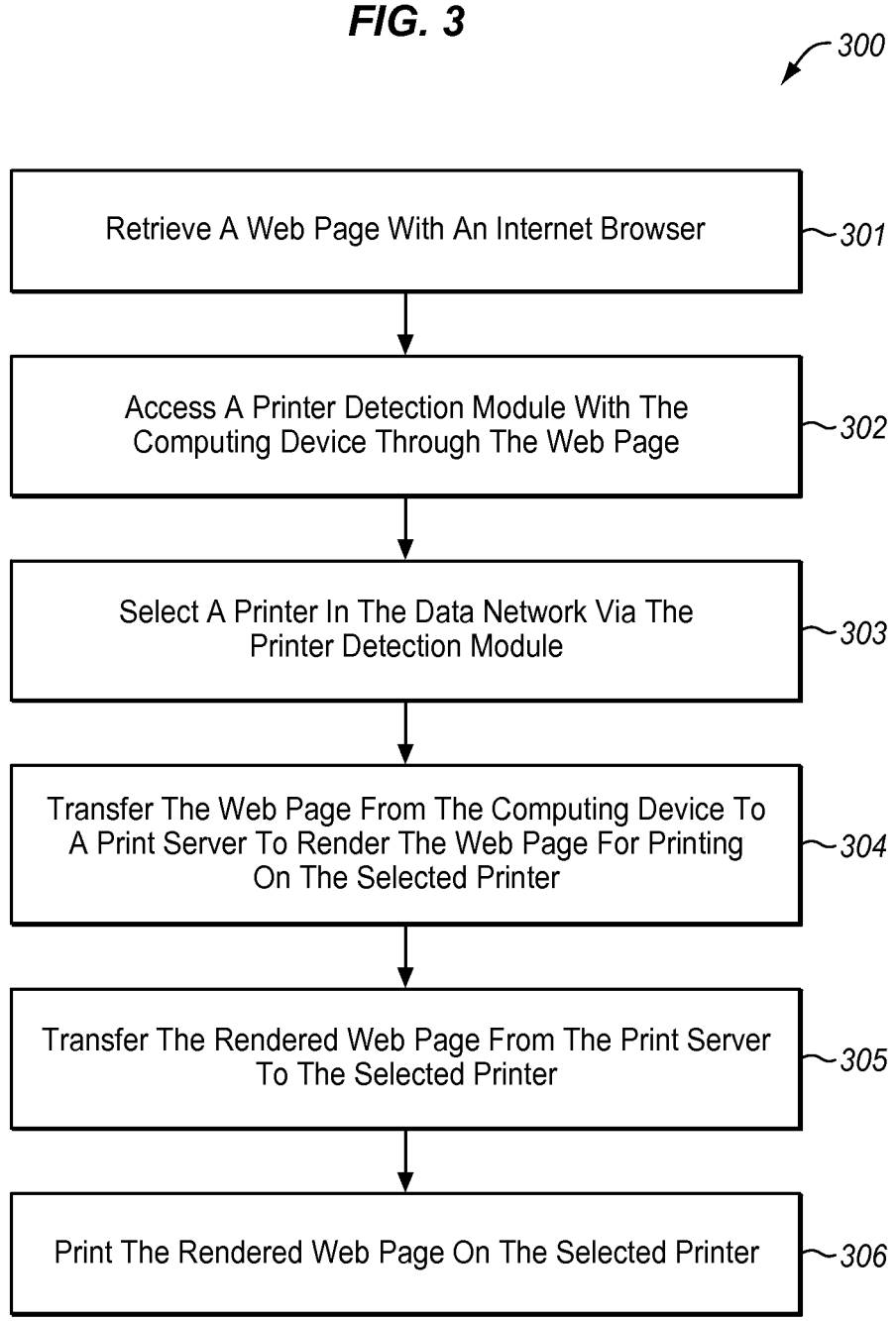
FIG. 3 is a flow chart illustrating the process of providing printer detection and selection capabilities to the client device in the remote rendering printing system.

FIG. 3 is a flow chart illustrating the process 300 of providing printer detection and selection capabilities as well as remote rendering capabilities to the client device 102. The process 300 generally initiates when a user of the client device 102 desires to print a webpage viewed within an Internet browser of the client device 102. In this regard, the client device 102 may send a request to the web server 150 to retrieve a webpage using an Internet browser, in the process element 301. The webpage includes a printer detection module that is operable to provide printer detection and selection capabilities to the client device 102. The printer detection module is operable within the confines of the Internet browser/operating system of the client device 102. For example, webpages are generally configured with software instructions, such as HTML and JavaScript, that are operable within the confines of an Internet browser such that various images, video, and text are viewable through the display 118. The printer detection module may be configured within the webpage as an applet that provides printer detection and selection capabilities to the client device 102 such that the client device 102 may print that webpage when desired. In this regard, the client device 102 may access the printer detection module through the webpage, in the process element 302.

The printer detection module may query for printing devices 104 in the data network 108 to provide a list of the printing devices 104 to the client device 102 such that a user of the device may select one or more of the printing devices 104 for printing the retrieved webpage. In doing so, the printer detection module may determine the data network in which the client device 102 is operating. For example, in the case of a mobile device, the client device 102 may venture into the data network 108 where the printing devices 104-1 . . . N operate. The data network 108 may be a LAN (e.g., wireless and/or wired) or some other data network where the printing devices 104-1 . . . N have Internet addresses. The printing devices 104-1 . . . N, however, are not accessible outside the data network 108. In this regard, the printer detection module may determine that the client device 102 is operating within the data network 108 and then query the printing devices 104-1 . . . N within the data network 108 using the Internet addresses of the printing devices 104-1 . . . N. The printing devices 104-1 . . . N respond to the queries with information pertaining to the printing devices 104-1 . . . N (e.g., printer model, printer type, printer capabilities 112, physical location, etc.). The user may then select one or more of the printing devices 104-1 . . . N in the data network 108 via the printer detection module within the webpage, in the process element 303.

Once selected, the client device transfers the webpage to the print server 106 (or at least the Uniform Resource Locator of the webpage, "URL") to render the webpage for printing on the selected printer, in the process element 304. Along with this render request, information pertaining to the selected printing device(s) 104 is also passed to the print server 106. For example, in this scheme of remote print rendering, the print drivers of the printing devices 104-1 . . . N are maintained within the print server 106. The print server 106 uses this selected printer information to locate the correct print driver and render the webpage for printing on the selected printing device 104. Thereafter, the print server 106 transfers the rendered webpage to the selected printer via a render response through the intermediary client device 102, in the process element 305, as the printing devices 104 are not available to users outside the data network 108. The rendered response may be conveyed to the printer detection module operating within the webpage being viewed within the client device 102. The printer detection module may then transfer the rendered webpage to the selected printing device 104 such that the rendered webpage may be printed in the process element 306. In doing so, the client device 102 may display the rendered page to the user for approval prior to printing.

Figure 4:
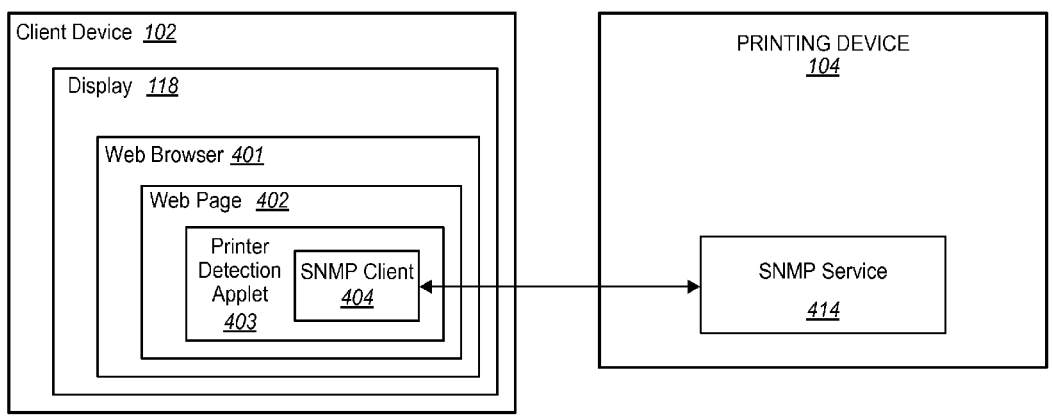
FIG. 4 is a block diagram of an exemplary communication link between the client device and a printer.

FIG. 4 is a block diagram of an exemplary communication link between the client device 102 and a printing device 104. In this embodiment, the functionality of the printer detection module is configured in an applet 403 of the webpage 402 in the web browser 401 that includes an SNMP client 404 (where SNMP stands for Simple Network Management Protocol). The SNMP client 404 is operable to open a TCP connection to the data network 108 and send a broadcast SNMP query packet to query each of the printing devices 104-1 . . . N within the data network 108. The SNMP query packet searches for devices with device description fields that match the Management Information Base (MIB) value for printers. The SNMP client 404 then queries the responding printing devices 104-1 . . . N for their model names and/or other identifying information via the SNMP service 414 of the printing device 104. The SNMP client 404 generates a table of the printing devices 104-1 . . . N and their associated Internet addresses. The applet 403 then displays the list of available printing devices 104-1 . . . N to the user via the webpage. The user may then select one or more the printing devices 104-1 . . . N from the list and submit a rendering request to the print server 106 to render the contents of the webpage according to the selected printing device 104.

Figure 5:
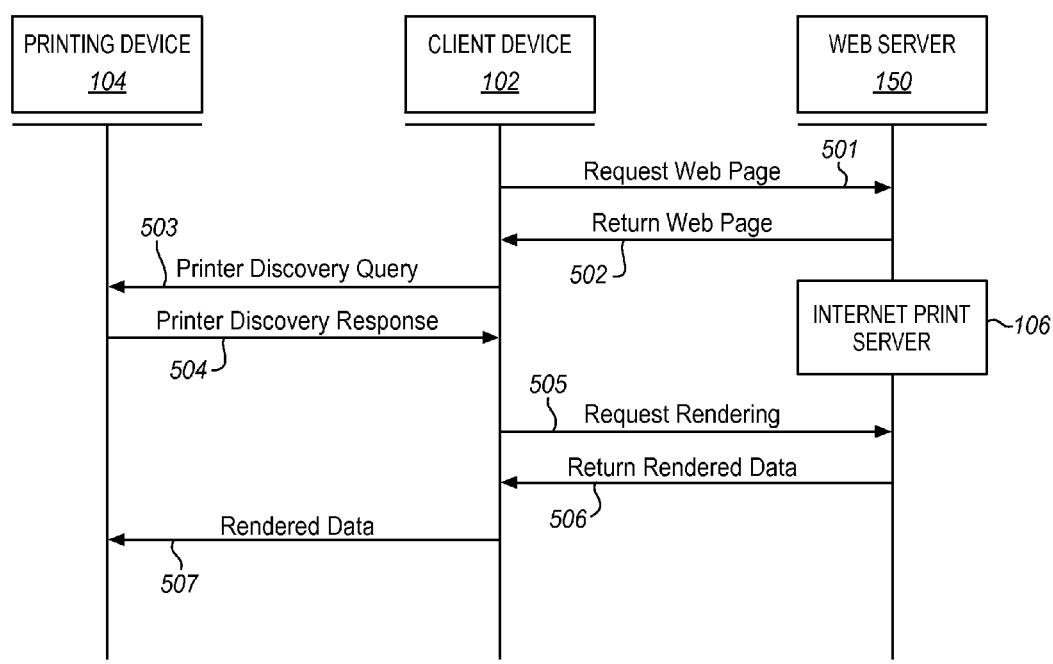
FIG. 5 is an exemplary communication processing flow of the printing system.

FIG. 5 is an exemplary communication processing flow of the printing system 100. A user of the client device 102 locates a webpage on the Internet via an Internet browser by sending a request for the webpage to the web server 150 with message 501. The web server 150 then returns the webpage data 502 to the client device 102 such that it may be viewed in the Internet browser of the client device 102. The webpage, having the printer detection module configured therein, sends a printer device discovery query 503 to the printing devices 104 (e.g., via the SNMP client 404). The printing devices within the data network 108 then transfer printer discovery responses 504 to the printer detection module operating within the client device 102. As mentioned, the printer discovery responses 504 include information pertaining to the printers, such as model numbers, Internet addresses, etc., such that the print server 106 may locate the appropriate print driver. The printer detection module then transfers a request for rendering 505 including the information associated with the selected printer(s). The Internet print server 106 then renders the webpage according to the print driver of the selected printer and returns the rendered webpage to the printer selection module as rendered data 506. In this regard, a user of the client device 102 may preview the rendered data and determine whether or not printing on the selected printing device 104 is still desired. If so, the printer selection module transfers the render data to the printing device 104 for printing on the selected printing device 104.

Figure 6:
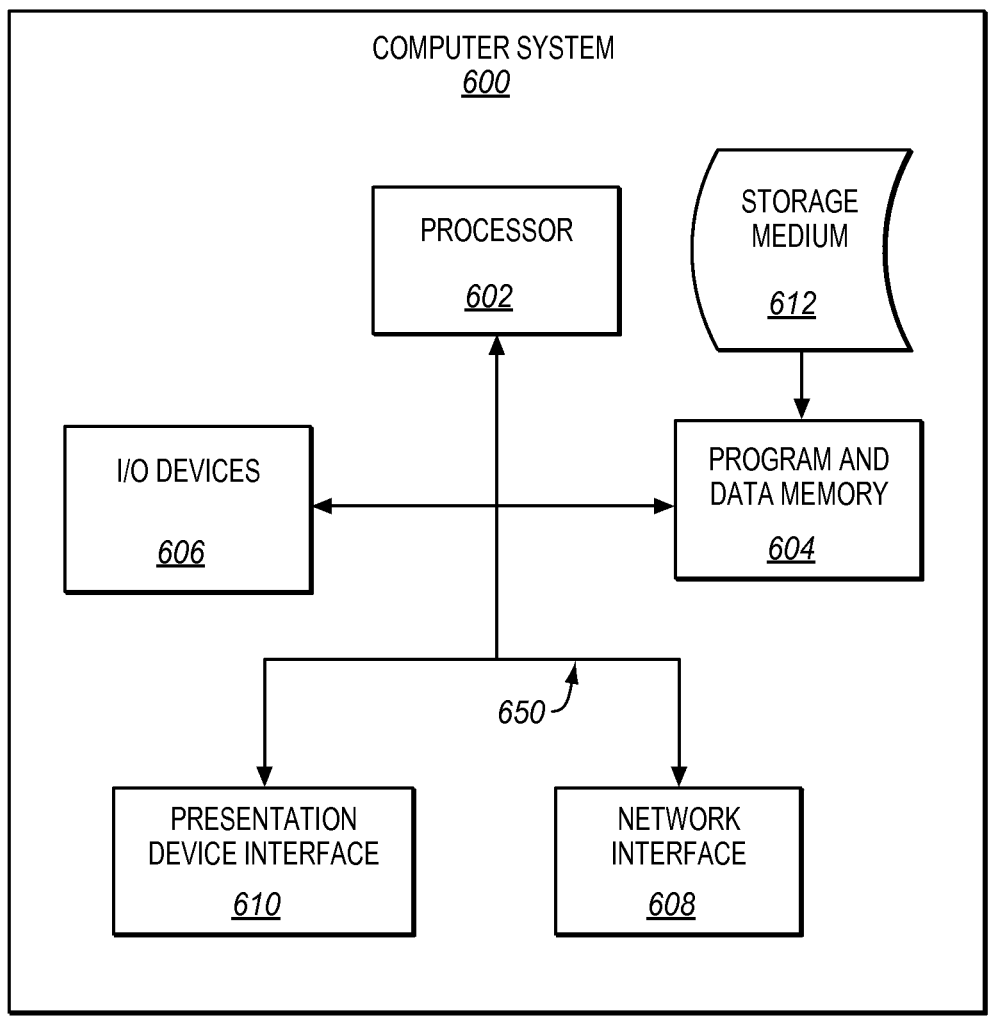
FIG. 6 is a block diagram of an exemplary computing device for executing programmed instructions to carry out the web based printer discovery and selection.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 6 is a block diagram depicting a computer system 600 operable to provide features and aspects hereof by executing programmed instructions and accessing data stored on a computer readable storage medium 612.

Furthermore, embodiments of the invention can take the form of a computer program product accessible from the computer-readable storage medium 612 providing program code for use by the computer system 600. For the purposes of this description, a computer readable medium can be any apparatus that can contain, store, communicate, or transport the program for use by the computer system 600.

The medium can be an electronic, magnetic, optical, electromagnetic, infrared, or semiconductor device. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

The computer system 600, being suitable for storing and/or executing program code, includes at least one processor 602 coupled to memory elements 604 through a system bus 650. The memory elements 604 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to couple to other data processing systems or storage devices through intervening private or public networks. Modems, cable modems, IBM Channel attachments, SCSI, Fibre Channel, and Ethernet cards are just a few of the currently available types of network or host interface adapters. The presentation device interface 610 may be coupled to the system to interface to one or more presentation devices, such as printing systems and displays for presentation of presentation data generated by the processor 602.

Although specific embodiments have been described herein, the scope of the invention is not limited to those specific embodiments. Accordingly, the scope of the invention is only defined by the following claims and any equivalents thereof.

What is claimed is:

1. A method of printing via a printer detection module operable within a webpage of a client device, the method comprising:
detecting printing devices in a first data network;
receiving a selection for one or more of the printing devices;
transferring printing characteristics of the selected one or more printing devices to a print server operable within a second data network, wherein the print server is physically and communicatively separated from the one or more printing devices by the second data network;
transferring the webpage from the client device to the print server through the second data network to render the webpage for printing on the selected one or more printing devices;
receiving the rendered webpage from the print server; and
transferring the rendered webpage to the selected one or more printing devices for printing therewith.

2. The method of claim 1, further comprising establishing an SNMP connection between the selected one or more printing devices and the printer detection module to determine an IP address of the selected one or more printing devices.

3. The method of claim 2, further comprising:
detecting the first data network via the printer detection module; and
determining IP addresses of each of the printing devices in the first data network.

4. The method of claim 1, further comprising generating a print job, wherein transferring the rendered webpage comprises configuring the rendered webpage within the print job and transferring the print job to the selected one or more printing devices via the client device.

5. The method of claim 1, further comprising:
determining a print driver of the selected one or more printing devices at the print server based on the printing characteristics; and
rendering the webpage via the print driver.

6. The method of claim 5, further comprising retrieving the print driver from an external source when the print driver is not located within the print server.

7. The method of claim 1, wherein the printer detection module is embedded in the webpage as an applet.

8. The method of claim 1, wherein transferring the webpage from the computing device to the print server comprises transferring a Uniform Resource Locator (URL) of the webpage to the print server for retrieval of the webpage by the print server.

9. A remote printing system, comprising:
a plurality of printing devices operable within a first data network;
a print server physically and communicatively separated from the printing devices by and operable within a second data network to connect to a client device from the second data network to render print jobs for the printing devices, wherein the printing devices are inaccessible via the second data network; and a printer detection module operable within a webpage of a web browser of the client device to detect the printing devices in the first data network and present the printing devices to the client device for selection, wherein the printer detection module is further operable to receive a printing device selection, transfer the webpage and the printing characteristics of the printing device to the print server, wherein the print server is further operable to determine a driver for the selected printing device based on the printing characteristics and render the webpage according to the determined driver.

10. The remote printing system of claim 9, wherein the printer detection module is configured as an applet within the webpage.

11. The remote printing system of claim 10, wherein the applet is operable to establish an SNMP connection to the selected printing device to determine an IP address of the selected printing device.

12. The remote printing system of claim 9, wherein the printer detection module is further operable to determine IP addresses of each of the printing devices in the first data network.

13. The remote printing system of claim 9, wherein the print server is further operable to generate a print job that includes the rendered webpage and transfer the print job to the selected printing device via the client device.

14. The remote printing system of claim 9, wherein the print server is further operable to retrieve the print driver from an external source when the print driver is not located within the print server.

15. The remote printing system of claim 9, wherein the printer detection module is further operable to transfer a Uniform Resource Locator (URL) of the webpage to the print server for retrieval of the webpage by the print server.

16. A printer detection module operable within a webpage executable on a client device, the printer detection module comprising software instructions that, when executed by a processor of the client device, direct the processor to:

detect printing devices in a first data network;
receive a selection for one or more of the printing devices;
transfer printing characteristics of the selected one or more printing devices to a print server in a second data network, wherein the print server is physically and communicatively separated from the one or more printing devices by the second data network;
transfer the webpage from the client device to the print server through the second data network to render the webpage for printing on the selected one or more printing devices;
receive the rendered webpage from the print server; and
transfer the rendered webpage to the selected one or more printing devices for printing therewith.

17. The printer detection module of claim 16, further comprising software instructions that direct the processor to establish an SNMP connection between the selected one or more printing devices to determine IP addresses of the selected one or more printing devices.

18. The printer detection module of claim 16, further comprising software instructions that direct the processor to determine the first data network and determine IP addresses of each of the printing devices in the first data network.

19. The printer detection module of claim 16, further comprising software instructions that direct the processor to:
generate a print job comprising the rendered webpage; and
transfer the print job to the selected one or more printing devices via the print server.

20. The printer detection module of claim 16, wherein the printer detection module is configured as an applet that is embedded in the webpage.

21. The printer detection module of claim 16, further comprising software instructions that direct the processor to display the rendered webpage via the client device prior to printing.

22. The printer detection module of claim 16, wherein the printing characteristics of the selected one or more printers are operable to direct the print server to determine the appropriate one or more print drivers to render the webpage.

23. The printer detection module of claim 16, further comprising software instructions that direct the processor to transfer a Uniform Resource Locator (URL) of the webpage to the print server for retrieval of the webpage by the print server.

* * * * *